United States Patent [19]

Chappell

[11] 4,356,000
[45] Oct. 26, 1982

[54] SOLID WASTE DERIVED FUEL

[75] Inventor: Christopher L. Chappell, Lichfield, Great Britain

[73] Assignee: Leigh Interests Limited, Birmingham, England

[21] Appl. No.: 206,171

[22] Filed: Nov. 12, 1980

Related U.S. Application Data

[63] Continuation of Ser. No. 74,101, Sep. 10, 1979, abandoned.

[30] Foreign Application Priority Data

Sep. 15, 1978 [GB] United Kingdom ............... 36983/78

[51] Int. Cl.³ ........................... C10L 5/12; C10L 5/48
[52] U.S. Cl. .................................... 44/1 D; 44/16 A; 44/26
[58] Field of Search ........... 44/1 A, 1 D, 16 A, 16 C, 44/26

[56] References Cited

U.S. PATENT DOCUMENTS

| | | | |
|---|---|---|---|
| 419,866 | 1/1890 | Murray | 44/26 |
| 753,246 | 3/1904 | Dorr | 44/26 |
| 824,680 | 6/1906 | Zuiderhoek | 44/26 |
| 1,295,456 | 2/1919 | Ekstrom | 44/26 |
| 1,606,867 | 11/1926 | Broadbridge et al. | 44/1 A |
| 1,885,839 | 11/1932 | Kern et al. | 44/26 |
| 4,078,902 | 3/1978 | Olson | 44/16 A |

FOREIGN PATENT DOCUMENTS

| | | | |
|---|---|---|---|
| 1876 | of 1883 | United Kingdom | 44/26 |
| 1198958 | 7/1970 | United Kingdom | 44/1 D |

*Primary Examiner*—Carl F. Dees
*Attorney, Agent, or Firm*—Cushman, Darby & Cushman

[57] ABSTRACT

A solid pulverizable fuel of consistent calorific value is made by mixing a thick mobile, for example an oily or tarry waste with fly ash, cement and water. The calorific value of the fuel may be enhanced by using a fly ash type material with significant calorific value. One such material is colliery waste.

9 Claims, No Drawings

SOLID WASTE DERIVED FUEL

CROSS-REFERENCE TO RELATED APPLICATIONS

This is a continuation of my earlier application Ser. No. 74,101 filed Sept. 10, 1979, now abandoned.

DESCRIPTION

This invention relates to a fuel derived from thick mobile wastes, usually tarry and/or oily, in character, which have an appreciable calorific value.

Such wastes have proved difficult to reclaim and use as fuels for the following reasons:

(a) These wastes often contain suspended solids, grit, fibre which make them difficult to feed into boilers and incinerators because blockages occur in the jets, pumps, etc.

(b) These thick wastes having a high viscosity need to be heated prior to feeding into the heat reclamation unit or incinerator and this is not a commonly available facility.

(c) These wastes are often separated into layers, particularly if they contain water, and normally there are large variations in calorific values in various layers of the waste. When such wastes are fed to an incinerator or steam generator, the variation in calorific value is unacceptable either because too much or insufficient heat is released on combustion, giving rise to unacceptable variations in the operating parameters of the burning equipment.

(d) These wastes, because of their mobility, are difficult to store compared to solid wastes.

Substantial volumes of these wastes are currently tipped on landfill sites in the United Kingdom because they are difficult to reclaim or reuse or recover the heat values or chemicals from them. Such wastes deposited on land can also give rise to environmental impairment.

The process of the present invention is applicable to some wastes such as lubricating oils, which can be reclaimed by other means such as dehydration and distillation/re-refining, or which can be fed easily to heat reclamation or incineration units. The quantities that arise, however, may not justify such methods of reclamation.

The process of the present invention has for an objective the production of a product which has the following features:

(a) Solidity;
(b) ease of pulverisation and low compression strength;
(c) a reasonably consistent calorific value;
(d) can be readily stored without elaborate storage facilities.

According to the present invention there is provided a process for the production of a fuel from a waste of the kind set out above, such process comprising adding to the waste, in the presence of water, a finely divided aluminium silicate based substance such as fly ash thereby making a reasonably homogenous mixture and incorporating, usually by subsequent addition, a hydraulic cement in the mixture.

The presence of water is essential to achieve the setting reaction and this usually involves an addition of water. The mixture remains mobile or very thick and viscous without the presence of water and does not set. The fly ash or similar acts as an emulsifying agent in that the waste particles coat particles of fly ash which results in the even distribution of the waste throughout the mixture. There should be sufficient fly ash present for some cementitious reaction to occur with the cement. It is conceivable that with certain fly ashes containing large amounts of lime that the subsequent addition of cement would not be necessary.

A preferred alumino-silicate is the low grade coal fines, hereinafter called colliery waste, produced as a waste material from the washing of coal. These usually have too low a calorific value to enable them to be marketed directly as a fuel. They are consequently lagooned and large quantities have accumulated. Colliery waste has been found to possess good oil retention properties. The moderate calorific value of colliery waste may be improved by incorporating it in the product either by itself or in combination with other alumino silicate materials.

The wastes with which the invention is concerned usually have a flash point greater than 23° C. Wastes with lower flash points can present volatility problems.

The "hydraulic cement" referred to above comprehends not only Portland cement but also lime. The fly ash can in this latter event provide the silicate for the cementitious setting reaction.

The invention further comprises the fuel product made by the process set out above.

The following experimental examples illustrate the invention:

EXAMPLE 1

To 2,000 g of an oily sludge waste 3,000 g of water was added and 7,200 g of fly ash was mixed in to form a reasonably homogenous mixture. 1,100 g of ordinary Portland cement was added and this was mixed into the waste. The mixture set into a low strength solid which is easily powdered into a soil-like consistency. The final product had a calorific value of 4,700 BTU/lb., which is similar to that of a waste derived fuel from domestic refuse.

We have found that in the above example at least 5,000 g of the fly ash can be replaced by an inert, finely divided solid such as ground chalk, waste lime fines or similar. This solid can itself have a calorific value and be for example coal slack. The fly ash usually has a calorific value and indeed can be chosen for its carbon content and hence its calorific value.

EXAMPLE 2

An oily waste containing water from a grinding process.

500 g of an oily waste (containing 300 g of mineral oil, 150 g of water and 50 g of inorganic solids including iron oxide) was mixed with 400 g of fly ash to produce a reasonable homogenous mixture. 100 g of ordinary Portland cement was added. The mixture cured to give a solid which was easily friable in about four days. A similar solid was obtained by curing in an oven containing a water saturated atmosphere at 65° C. for 16 hours. The measured calorific value of the solid was 7,420 BTU/lb.

This example shows the process is applicable to oily sludges containing solids.

EXAMPLE 3

Waste 220° Fuel Oil Containing Silt

To 500 g of waste 220° fuel oil, 300 g of water was added which resulted in a mixture of two layers, oil and water. 330 g of fly ash and 330 g of colliery waste was added and mixed into the oil and water using a high speed mixer. A reasonably homogenous mixture resulted to which 110 g of ordinary Portland cement was added. The mixture set into a solid which was easily crumbled in 4–5 days (there was three runs of this experiment). The solid material resulting had a calorific value of 5,700 BTU/lb. after five days.

When stored in the open air but covered from rainfall, etc. some loss of water was observed and an increase in calorific value to 6,294 BTU/lb. was found after 12 days from preparation, an increase of approximately 10% in calorific value.

EXAMPLE 4

Acid Tar

The wastes are produced from the washing of oils during refining with sulphuric acid to remove impurities and typically have a high oil content and high acidity.

460 g of water and 100 g of hydrated lime were mixed together. To this mixture 250 g of acid tar was added and stirred vigorously to neutralise the free acidity in the acid tar. 180 g of fly ash and 90 g of ordinary Portland cement were added and these were mixed in by a paddle mixer to give a homogenous slurry.

The slurry set into a low strength solid which easily crushed to give a soil-like mixture when compressed after five days and had a calorific value of 3,900 BTU/lb. When the hydrated lime was excluded from the mixture or replaced by a further 100 g of fly ash, the mixture remained viscous and did not set. When the percentage of acid tar in the mixture was increased to above 35%, maintaining the same ratio of other components, the mixture also did not set.

EXAMPLE 5

Gas Tar

Gas tars produced from coal during the production of coal gas can present a difficult disposal problem, especially when tipped onto land.

To 400 g of waste gas tar, 200 g of water was added together with 400 g of finely ground chalk and 420 g of fly ash. These were mixed together with a high speed mixer to give a relatively homogenous slurry. 210 g of ordinary Portland cement was added and also mixed in with a high speed mixer. The product set after three days into a soil-like solid with a calorific value of 3,200 BTU/lb.

EXAMPLE 6

Waste from Oil Reclamation Plant

To 3,000 g of a waste oily sludge produced as a residue from an oil/water separation plant (waste contained 66% mineral oil, 16% ash on ignition, fibres and 18% water) 2,330 g of an organically contaminated liquid waste was added. To this was added 7,000 g of fly ash and 1,200 g of ordinary Portland cement. The mixture set into a soil-like solid in about four days and had a calorific value of 4,900 BTU/lb.

This example illustrates that organically contaminated aqueous wastes can be used to replace the water providing the water is the major ingredient of the aqueous waste. The organically contaminated liquid wastes which can be used to replace the water include:

(a) Phenolically contaminated liquids and waste waters;
(b) waste polyvinyl alcohol liquids and sludges;
(c) waste organic paints in emulsion or suspension in water providing the water is the major proportion of the waste;
(d) sewage effluents;
(e) digested and other sewage sludges:
(f) phenol formaldehyde resin liquid aqueous wastes.

The use of organically contaminated liquid instead of water may enhance (normally marginally) the calorific value of the solid product obtained.

EXAMPLE 7

Blending of Oily and Similar Wastes to Improve Calorific Value 1,000 g of gas tar derived waste (containing 50% soil, 35% water and 15% gas tar oil) was mixed with 1,000 g of a waste lubricating oil (analysis 66% mineral oil, 33% water). To this mixture was added 600 g of fly ash and 200 g of ordinary Portland cement. The slurry set into a solid in four days and the solid was easily crushed to a soil-like material. The product had a calorific value of 4,000 BTU/lb.

This example illustrates that various waste materials may be blended together to give a more uniform final calorific value of the solid product obtained.

EXAMPLE 8

Improving the Calorific Value of Coliery Waste

To 3,300 g of an oil, rubber and carbon sludge containing 30.3% water was added 1,000 g water, 5,000 g colliery waste and 700 g ordinary Portland cement. The product set to a friable product in seven days. The calorific value of the collery waste was found to be 4,800 BTU/lb. whereas that of the derived fuel was 6,400 BTU/lb.

I claim:

1. A method of manufacturing a solid storable pulverizable fuel with a substantially consistent calorific value, said method comprising the successive steps of:
   (a) coating particles of a finely divided aluminum silicate based substance with a mobile waste of appreciable calorific value by mixing the waste, in the presence of water, with particles of the finely divided aluminum silicate based substance to provide a substantially homogenous mixture of finely divided particles coated with the waste, and thereafter
   (b) solidifying the homogenous mixture of step (a) by the incorporation of a hydraulic cement in an amount sufficient to produce the solid storable pulverizable fuel.

2. A method as claimed in claim 1 wherein the alumino-silicate based substance has a significant calorific value.

3. A method as claimed in claim 2 wherein the said material comprises low grade coal fines.

4. A method as claimed in claim 1 including an inert finely divided solid.

5. A method as claimed in claim 4 wherein the said solid has a calorific value.

6. A method as claimed in claim 1 wherein the water is provided by organically contaminated aqueous waste.

7. A method as claimed in claim 2, 4, 6, or 1 wherein said aluminum silicate based substance is fly ash.

8. A solid storable pulverizable fuel of substantially consistent calorific value produced by the process of claim 1.

9. A method of manufacturing a solid storable pulverizable fuel with a substantially consistent calorific value, said method comprising the successive steps of:

1. coating fly ash particles with a mobile waste of appreciable calorific value by mixing the waste, in the presence of water, with the fly ash particles to provide a substantially homogenous mixture of finely divided fly ash particles coated with the mobile waste, and thereafter
2. solidifying the homogenous mixture of step (1) by the incorporation of a hydraulic cement in an amount sufficient to produce a solid storable pulverizable fuel having substantially consistent calorific value.

* * * * *